United States Patent [19]
Cook, Jr. et al.

[11] Patent Number: 5,117,435
[45] Date of Patent: May 26, 1992

[54] PRESSURE REGULATION SYSTEM FOR GAS LASER BASED ON TEMPERATURE OF ANODE STEM

[75] Inventors: Benjamin H. Cook, Jr., Livermore; William P. Kolb, Redwood City, both of Calif.

[73] Assignee: Coherent, Inc., Palo Alto, Calif.

[21] Appl. No.: 603,128

[22] Filed: Oct. 25, 1990

[51] Int. Cl.$^5$ .............................................. H01S 3/22
[52] U.S. Cl. ...................... 372/59; 372/34; 372/61; 372/29
[58] Field of Search ............... 372/58, 59, 61, 29, 372/34

[56] References Cited

U.S. PATENT DOCUMENTS 4,547,885 10/1985 Allen et al. ............................ 372/59
4,866,722 9/1989 Deki et al. ............................ 372/34

Primary Examiner—Léon Scott, Jr.
Attorney, Agent, or Firm—Limbach & Limbach

[57] ABSTRACT

A gas laser includes a housing containing a lasing gas. Means are provided for electrically exciting the gas including a cathode mounted at one end of the housing and an anode mounted at the other end. The temperature of the anode is monitored and a control signal is generated which is indicative of the temperature that is measured. An automatic gas supply apparatus is activated to vary the gas pressure in the housing in response to the control signal. Additionally, the temperature that is measured may be normalized to counteract the effects of the ambient temperature of the anode.

23 Claims, 5 Drawing Sheets

PRESSURE REGULATION SYSTEM FOR GAS LASER BASED ON TEMPERATURE OF ANODE STEM

FIELD OF THE INVENTION

This invention relates to the field of gas lasers. More particularly, this invention relates to a method and apparatus for maintaining proper discharge tube gas pressure.

BACKGROUND OF THE INVENTION

Gas lasers and their operation are well known. Such gas lasers are described in U.S. Pat. Nos. 4,674,092, 4,736,379 and 4,378,600 which are incorporated herein by reference. In the operation of a gas laser an electric voltage and current is maintained as appropriate across a cathode and an anode within a gas discharge tube. It is important that the proper amount of gas pressure be maintained to ensure optimal performance of the laser. More importantly, if gas pressure becomes too low, the laser discharge will become unstable and the anode will overheat with possible catastrophic results.

In commercial ion lasers, gas pressure is frequently measured indirectly. For example, gas pressure can be monitored by measuring variations in the voltage between the anode and the cathode. As the gas pressure is reduced, the voltage will change in a predictable manner allowing the operator or an automatic gas refill system to add an appropriate amount of gas to return the gas pressure to its desired operating level. Unfortunately, other factors such as cathode degradation and bore erosion may also affect the cathode to anode voltage in a manner that resembles a decrease in gas pressure. In the event the voltage measured changes due to one of these other factors, gas will be erroneously added resulting in having too high a gas pressure within the discharge tube for optimal laser performance.

SUMMARY OF THE INVENTION

The present invention relies upon the fact that as the gas pressure decreases the situs of the discharge extends through the anode and into the anode stem. When this occurs, the temperature of the anode stem increases. Accordingly, by monitoring the stem temperature, information about the gas pressure can be derived.

A gas laser according to the present invention includes a housing containing a lasing gas. Means are provided for electrically exciting the gas including a cathode mounted at one end of the housing and an anode mounted at the other end. The temperature of the anode stem is monitored and a control signal is generated which is indicative of the temperature that is measured. An automatic gas supply apparatus is activated to vary the gas pressure in the housing in response to the control signal. Additionally, the temperature that is measured may be normalized to counteract the effects of the ambient temperature on the anode stem temperature.

DETAILED DESCRIPTION OF THE PREFERRED EMBODIMENT

Figure 1:
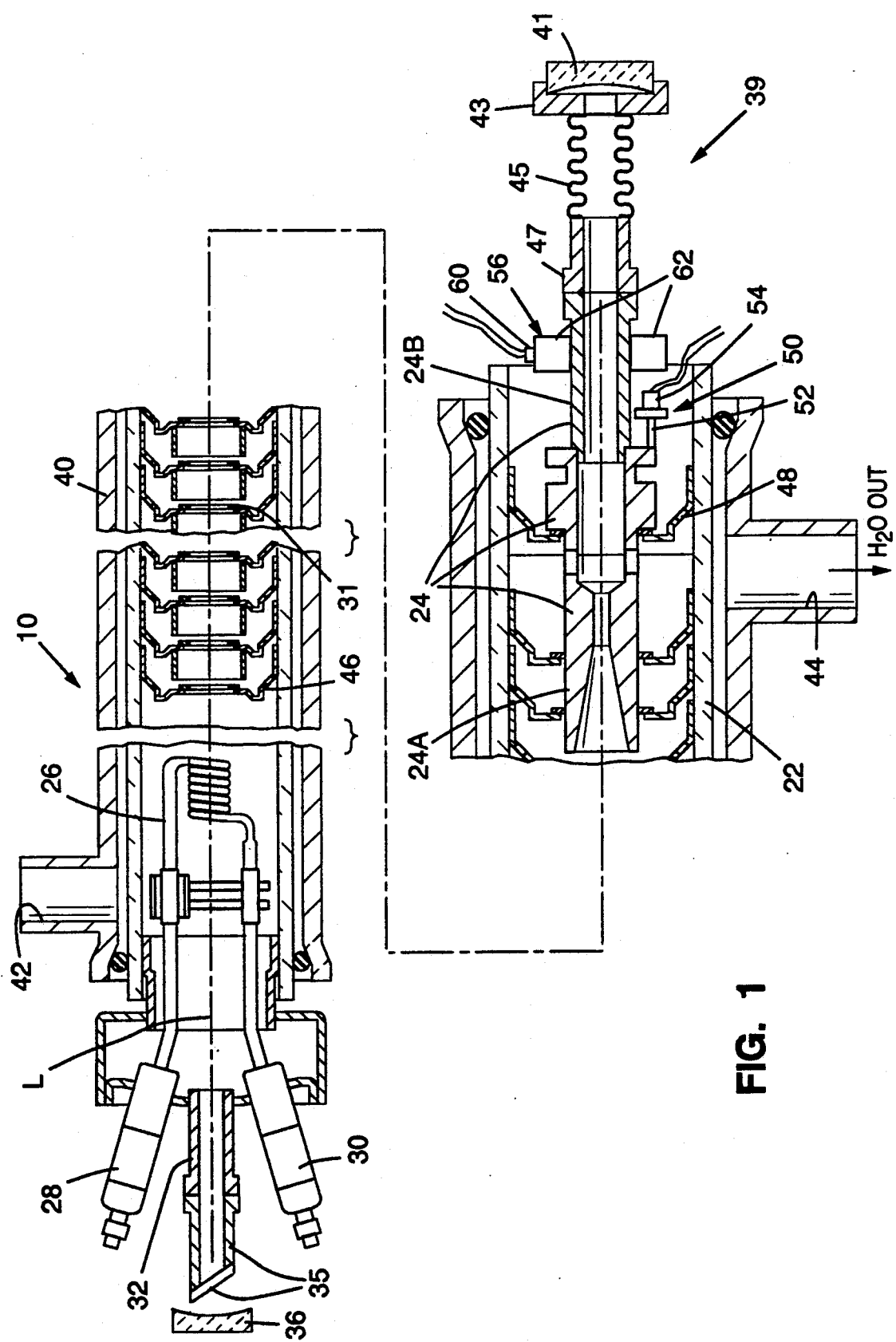
FIG. 1 shows a cross-section of a laser according the preferred embodiment of the present invention.

The preferred embodiment is a method and apparatus for maintaining a predetermined gas pressure within the discharge tube of a gas laser 10. FIG. 1 illustrates one type of gas laser in which the present invention can be practiced. It is important to note that the present invention can be implemented in any of a variety of commercially available gas lasers.

The laser 10 includes a thin walled ceramic tube 22, an anode assembly 24 and a cathode assembly 26. The cathode power supply leads 28 and 30 are coupled to the cathode assembly 26 to provide electric power to the cathode. A plurality of tungsten discs 31 are provided to contain the discharge at the center of the laser 10 around the axis L. A monel window support tube 32, provided at one end of the laser axis L, includes a window assembly 35 to allow the laser radiation to exit the discharge tube and impinge the mirror 36. At the opposite end of the laser, a sealed mirror assembly 39 includes a hermetically sealed mirror 41, a nickel iron alloy mirror seat 43 and a stainless steel bellows 45, which is sealed to the mating flange 47.

A water jacket 40 surrounds the discharge tube having a water inlet 42 and a water outlet 44. Water is circulated through the water jacket 40 by means of the inlet 42 and outlet 44 to cool the discharge tube. A plurality of copper cup members 46 which are braised to the tungsten discs 31 are provided to transfer heat from the axis L of the discharge tube to the cooled ceramic wall 22 of the discharge tube.

The vacuum seal cup 48 forms one boundary between the sealed interior and the exterior of the discharge tube. The anode 24A portion of the anode assembly 24 is in the interior of the discharge tube as is the inside diameter of the copper anode stem 24B. The cooling provided by the water flowing through the water jacket 40 affects the temperature of the anode 24A more directly than the anode stem 24B because of the cooling effect provided by the cups 46, the seal 48 and the location of the anode 24A interior to the discharge tube.

A temperature sensor 50 including a temperature probe 52 and a temperature sensing integrated circuit 54 is coupled to the anode 24A at the vacuum seal cup 48. A second temperature sensor 56 including a temperature sensing integrated circuit 60 is coupled to the anode stem 24B by a copper stem clamp 62. The anode stem 24B is preferably made of copper or another highly thermally conductive material. Such materials help maintain uniform data from the sensors over wide ambient or cooling water temperature ranges. The temperature sensing integrated circuit is preferably an AD592-AD. The first and second sensors 50 and 56 are coupled to an electronic control system (not shown).

Figure 4:
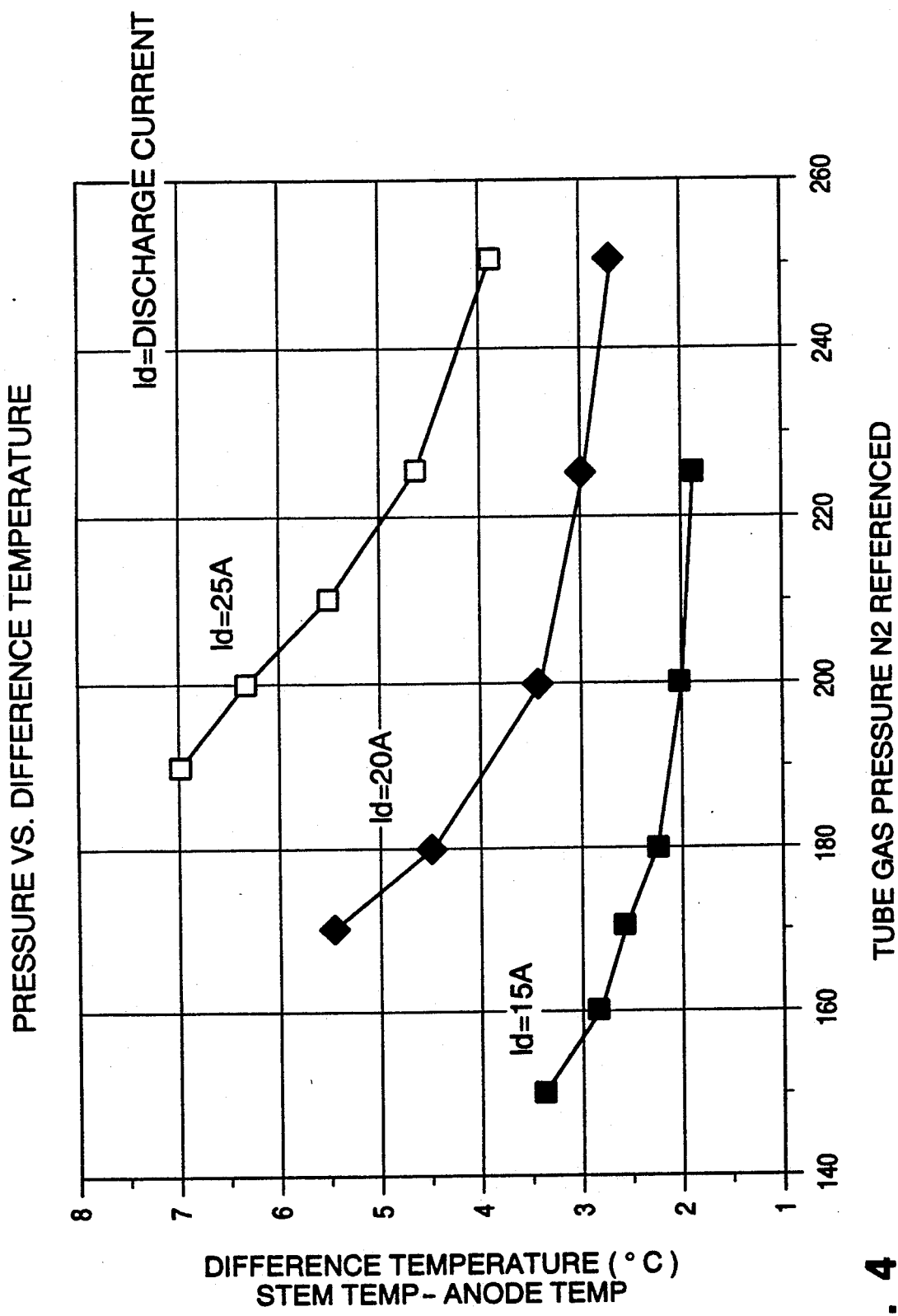
FIG. 4 shows a graph relating the difference between the temperature of the anode and the anode stem to the pressure of the lasing gas.

The lasing gas pressure affects the operation of the laser. The pressure of the lasing gas can decrease with time due to sputtering of the bore disks 31 and the cups 46 causing gas atoms to become entrapped under the sputtered material inside the discharge tube. As the lasing gas pressure drops, the mean free path between gas atoms increases, which allows some of the discharge to extend through and beyond the anode into the anode stem where it terminates. Because the stem is only indirectly cooled it heats up beyond its designed operating temperature, due to the added energy. With continuous operation, a typical gas laser will periodically require that a small amount of lasing gas be added. Thus, within the range of pressures that give reasonable laser performance, it can be shown that the stem temperature is a function of the gas pressure within the discharge tube as shown in FIG. 4.

Figure 2:
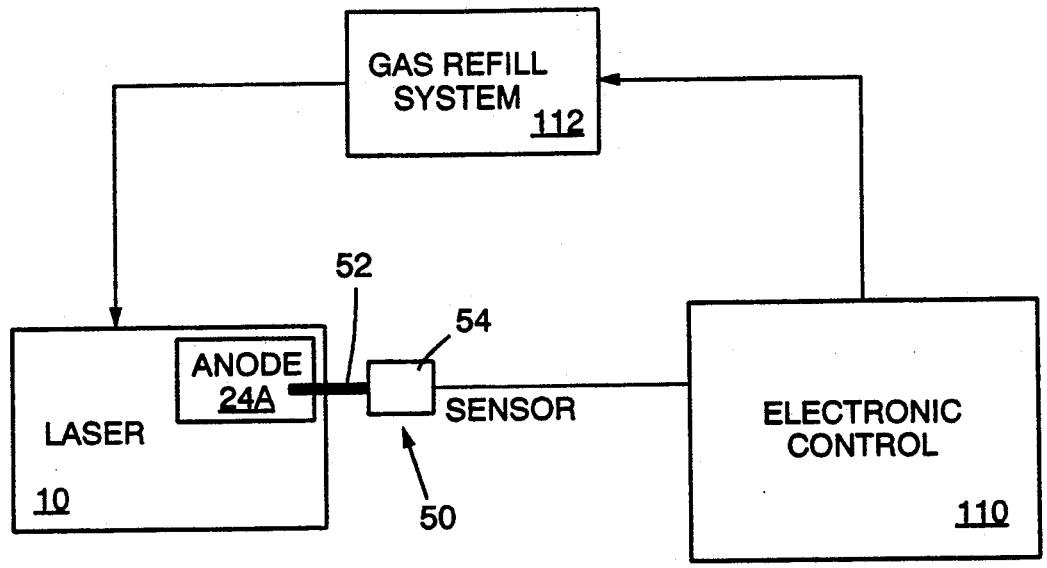
FIG. 2 shows a block diagram representing an embodiment of the present invention.

FIG. 2 shows a block diagram of a system incorporating the present invention. Note that similar components to those of FIG. 1 will bear the same reference numerals for ease of understanding. A gas laser 10 includes an anode 24A. A temperature sensor 50 measures the temperature of the anode 24A. The sensor 50 may include a temperature probe 52 and a temperature sensing integrated circuit 54.

The sensor 50 produces a signal that is proportional to the temperature measured by the sensor. The signal is coupled to an electronic control system 110. The electronic control system can be any commercially available controller, computer, microcontroller or a microcomputer. The electronic control system 110 can be a portion of the laser control systems or can be a stand alone electronic system. The electronic control system 110 is coupled to an automatic gas refill system 112. The automatic refill system 112 is electrically coupled to solenoid valves to adjust the gas pressure in the laser 10 upon an appropriate command from the electronic control system 110.

The temperature of the anode is controlled by a variety of factors in addition to the laser discharge including heating from the laser discharge and cooling from the water jacket. During operation of the laser, it is possible that the heating effect resulting from the laser discharge might remain constant while the temperature of the cooling water could change by several degrees. In such circumstances the system according to FIG. 2 might erroneously add lasing gas to the discharge tube. Accordingly, it is desirable that some means be present to normalize the effects of the ambient temperature on the anode temperature.

Figure 3:
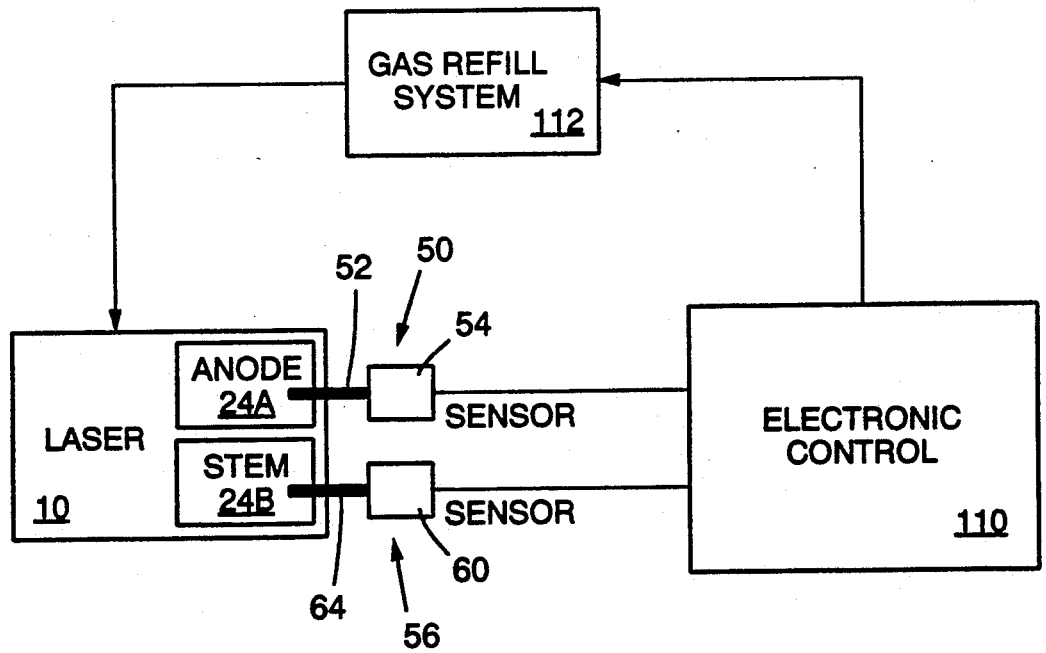
FIG. 3 shows a block diagram representing the preferred embodiment of the present invention.

FIG. 3 shows the system of FIG. 2 with an additional temperature sensor 56 including an integrated circuit 60 and a probe 64 for sensing the temperature of the anode stem 24B. The anode stem 24B is less effected by the cooling effect of the water jacket 40 because it is only indirectly cooled. The electronic controls 110 subtracts the temperature of the anode 24A from the temperature of the anode stem 24B to create a normalized temperature $\Delta T$.

FIG. 4 shows a graph of experimental data points comparing the normalized temperature $\Delta T$ (as defined above) to the pressure of the lasing gas in the discharge tube. As can be seen, as the gas pressure decreases, the normalized temperature increases. Note that the relationship is not linear. The normalized temperature $\Delta T$ is also a function of the laser discharge current. $\Delta T$ increases as the discharge current increases for increased power. Thus, there is a different relationship between $\Delta T$ and gas pressure for each discharge current.

Figure 5:
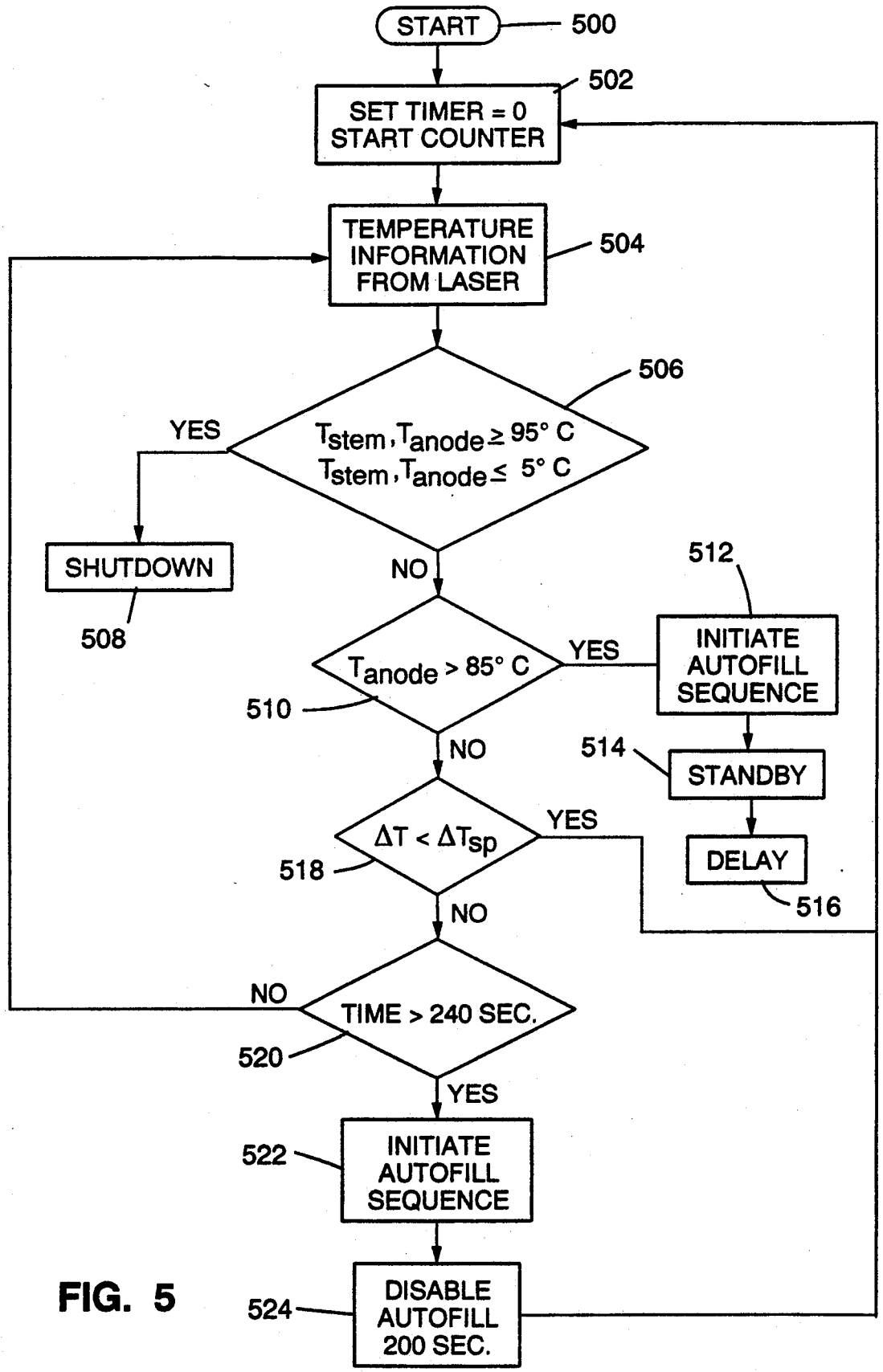
FIG. 5 shows a flowchart representing the sequence of the steps for carrying out the preferred embodiment.

FIG. 5 shows a flowchart describing the operation of the system shown in the block diagram of FIG. 3. The algorithm is begun at start block 500. A timer is reset and started in block 502. The data temperature for the anode and anode stem are received from the laser in block 504. If the temperature of the anode, $T_{anode}$, or anode stem, $T_{stem}$ is greater than or equal to 95° C. or less than or equal to 5° C., as shown in decision block 506, the system will immediately shut down in block 508, i.e., if $T_{anode}$, $T_{stem} \geq 95°$ C. or $T_{anode}$, $T_{stem} \leq 5°$ C. The 95° limit is established as the upper limit at which damage will begin to occur to the integrated circuits 54 or 60.

The laser will never operate under ordinary conditions with the anode temperature less than 5° C. Thus, the 5° lower limit is established as the temperature indicating a malfunction in the sensors.

If the temperature of the anode and the stem are between 95° C. and 5° C., it is next determined whether the anode temperature is greater than 85° C. in decision block 510. If the anode temperature is greater than 85° C. an autofill sequence is initiated in block 512 to add a predetermined amount of gas. The autofill system then goes into standby mode in block 514, where the laser is operated in a low current, minimal output mode to allow the laser to recover from operation as the excessive temperature of 85° C., and is delayed from returning to normal operation for a predetermined time in block 516. After the delay, the timer is reset to zero and the counter is started again in block 502. This sequence is desirable to prevent thermal runaway. If a laser tube is operated for some period of time at very low discharge current, gas will be consumed but the criteria for a fill sequence may not have been met. If the system operator the increases the current substantially the discharge tube may require a fill quicker then the standard 240 second delay would allow. The 85° C. sequence acts as a safety mechanism for such events.

If the temperature of the anode is less than or equal to 85° C., it is next determined whether difference between the temperatures of the anode stem and the anode, $\Delta T$, is less than the set point difference, $\Delta T sp$. In other words, if the difference in temperature between the anode stem and the anode is less than the predetermined set point difference, then the timer is reset and the counter is restarted in block 502. This is normal operation for the laser. The set point is empirically established for each laser prior to shipment to a customer. Ideally the set point is established to be 1° C. higher than $\Delta T$ measured for a specified discharge current at optimal gas pressure. The value is established to ensure safe and optimal operation for each laser. Because optimum set point varies with discharge current, lasers with wide operating current ranges require a set point which varies as a function of discharge current.

Otherwise, if $\Delta T \geq \Delta T sp$, it is next determined whether this difference is maintained for longer than 240 seconds in block 520. The time is compared to 240 seconds. The 240 seconds delay is desireable to avoid adding lasing gas for anomalous readings, temperature data spikes, or temperature transients caused by discharge current changes. If the time is less than 240 seconds, the temperature information is again received from the laser in block 504 and the portion of the algorithm already described is repeated. If the time is longer than 240 seconds, an autofill sequence is initiated in block 522 to add 5 milliTorr of gas and then the autofill equipment is disabled for 200 seconds in block 524. This delay allows the sensed temperatures time to stabilize before additional gas can be added. Then the timer is set to 0 and the counter is started again in block 502.

Figure 6:
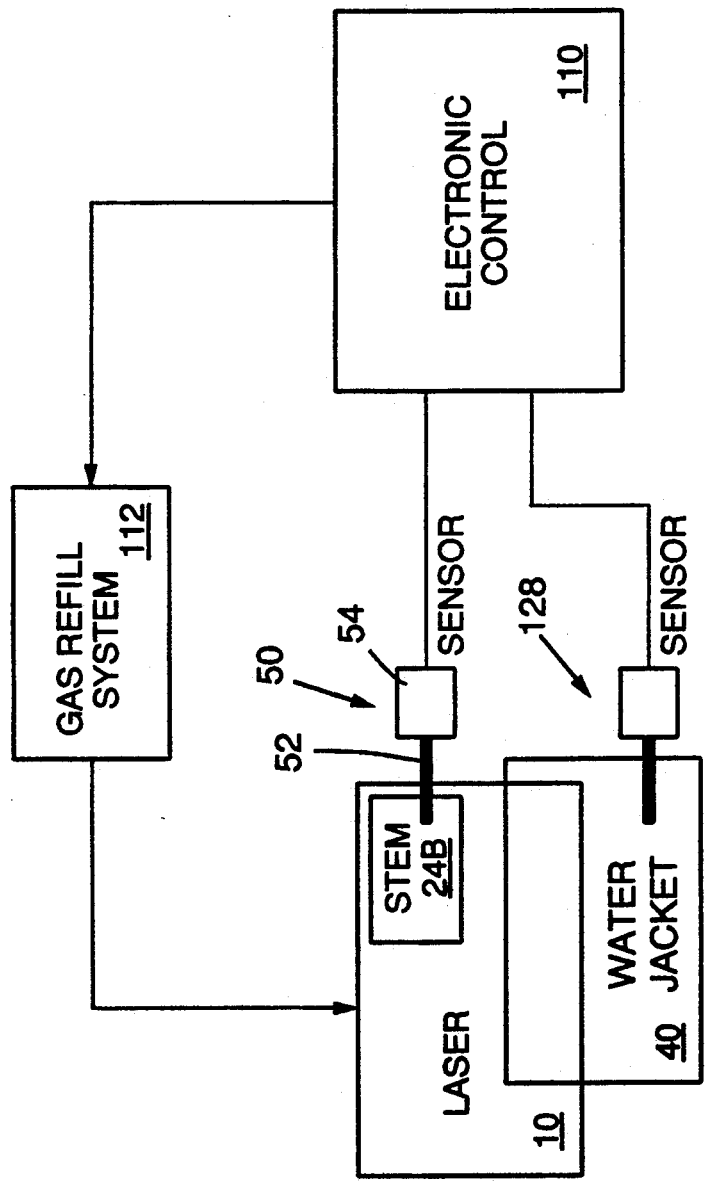
FIG. 6 shows a block diagram representing an alternate embodiment of the present invention.

Another way to normalize the temperature of the anode is shown in the block diagram of FIG. 6. That figure shows the system of the block diagram of FIG. 3 with the addition of the water jacket cooling system 126 (40 FIG. 1) and temperature sensor 128. The sensor 128 measures the temperature of the water jacket cooling system 126 and that temperature is used to normalize the operating temperature of the anode stem 24B. The sequence of steps would be substantially similar to that shown in FIG. 5. However, the set point temperature would necessarily be adjusted to a new value.

What is claimed is:

1. A gas laser comprising:
   a housing for containing a lasing gas under pressure;
   a means for electrically exciting the gas including a cathode mounted at one end of the housing and an anode mounted at the other end thereof, said anode having a temperature;
   means for monitoring the temperature of said anode and generating a control signal indicative of said temperature;
   gas supply means coupled to said housing for varying the gas pressure in the housing; and
   regulation means for actuating said gas supply means in response to variations in the control signal to vary the gas pressure in said housing.

2. A system for use in a gas laser having a housing with an amount of lasing gas under pressure, said gas laser including an anode having a temperature, said system for stabilizing the laser, said system comprising:
   means for measuring variations in the gas pressure in said housing, said means including a means for measuring the variations in temperature of said anode; and
   means for changing the amount of gas in the housing in response to the measured variations in temperature to stabilize the laser.

3. The system according to claim 2 further comprising means for normalizing the measured temperature to correspond to changes in gas pressure.

4. A gas laser comprising:
   a gas filled discharge tube including an anode having an operating temperature and a cathode;
   sensing means for sensing the operating temperature of the anode; and
   means for adding gas to the discharge tube when the sensed temperature exceeds a predetermined operating temperature.

5. The gas laser according to claim 4 which is operated in an ambient environment having a temperature and wherein the sensed operating temperature is affected by ambient temperature so that the sensing means further comprises a first temperature sensor coupled to sense an operating temperature of the anode and a second temperature coupled to sense the ambient temperature.

6. The gas laser according to claim 5 further comprising a water cooling jacket which controls the ambient temperature of the anode.

7. The gas laser according to claim 6 wherein the predetermined operating temperature comprises a predetermined difference between the operating temperature and the ambient temperature to normalize the sensed temperature.

8. The gas laser according to claim 4 wherein the means for adding gas further comprises delay means to delay adding gas until the predetermined operating temperature remains unchanged for a predetermined duration.

9. The gas laser according to claim 8 further comprising means to disable the means for adding gas after gas is added for a sufficient time to allow the gas pressure within the tube to stabilize.

10. The gas laser according to claim 8 further comprising means to override the delay means when the first temperature exceeds an operating predetermined value.

11. The gas laser according to claim 10 further comprising means to de-energize the laser of the operating temperature exceeds a second predetermined value.

12. The gas laser according to claim 4 further comprising an anode stem and a water cooling jacket coupled to the anode so that the sensed temperature is affected by water temperature and wherein the sensing means further comprises a first temperature sensor coupled to sense an operating temperature of the anode and a second temperature coupled sense an operating temperature of the anode stem.

13. The gas laser according to claim 12 wherein the predetermined operating temperature comprises a predetermined difference between the operating temperatures of the anode and the anode stem to normalize the sensed temperature.

14. The gas laser according to claim 13 wherein the means for adding gas further comprises delay means to delay adding gas until the predetermined operating temperature remains for a predetermined duration.

15. The gas laser according to claim 14 further comprising means to disable the means for adding gas after gas is added for a sufficient time to allow the tube to stabilize.

16. The gas laser according to claim 14 further comprising means to override the delay means when if the operating temperatures of the anode or anode stem exceed a first predetermined value.

17. The gas laser according to claim 16 further comprising means to de-energize the laser when if the operating temperatures of the anode or the anode stem exceed a second predetermined value.

18. A gas laser comprising:
   a) a gas-confining tube having a central axis;
   b) a plurality of spaced apart discs within and generally perpendicular to the tube, each having a central aperture coaxially aligned with the axis of the tube to define a central discharge path;
   c) a plurality of thermal conducting members thermally coupled to the discs and to the tube to conduct heat generated in the discharge path to the tube;
   d) cooling means coupled to remove heat from the tube;
   e) a cathode coupled to a first end of the discharge path;
   f) an anode coupled to a second end of the discharge path;
   g) sensing means coupled to the anode for measuring the operating temperature of the anode and generating an electrical signal in response thereto;
   h) control means coupled to the sensing means for receiving said electrical signal; and
   i) means for adding gas to the tube activated by the control means after the anode exceeds a predetermined operating temperature.

19. A method for maintaining a predetermined gas pressure in a gas-confining tube of a gas laser having an anode comprising the steps of:
   a) sensing a temperature of the anode; and b) automatically adding gas to the tube when if the temperature exceeds a first predetermined value.

20. The method according to claim 19 wherein said step of adding gas to the tube is delayed for a predetermined period of time to ensure that the first predetermined temperature value has been stably reached.

21. The method according to claim 20 further comprising the step of overriding the step of delaying when temperature of the anode exceeds a second predetermined value.

22. The method according to claim 20 further comprising the step of de-energizing the gas laser when temperature of the anode exceeds a third predetermined value.

23. The method according to claim 19 wherein the anode includes an anode stem and wherein the step of sensing a temperature further comprises the steps of:
a) sensing the anode temperature;
b) sensing the anode stem temperature; and
c) calculating a difference between the anode temperature and the anode stem temperature.

* * * * *